US008266611B2

(12) United States Patent
Song

(10) Patent No.: US 8,266,611 B2
(45) Date of Patent: Sep. 11, 2012

(54) HARD DISK DRIVE WITH DISK EMBEDDED DOS BOOT IMAGE AND FIRMWARE DOWNLOAD METHOD

(75) Inventor: Jae-Ik Song, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 1253 days.

(21) Appl. No.: 11/842,218

(22) Filed: Aug. 21, 2007

(65) Prior Publication Data

US 2008/0091935 A1   Apr. 17, 2008

(30) Foreign Application Priority Data

Aug. 21, 2006  (KR) .................. 10-2006-0078695

(51) Int. Cl.
*G06F 9/44* (2006.01)
*G06F 9/445* (2006.01)
(52) U.S. Cl. .................. 717/168; 717/173; 717/174
(58) Field of Classification Search .................. None
See application file for complete search history.

(56) References Cited

U.S. PATENT DOCUMENTS

| 4,138,718 | A | * | 2/1979 | Toke et al. ..................... 700/7 |
| 5,778,167 | A | * | 7/1998 | Carrel et al. .................. 714/6.13 |
| 5,835,761 | A | * | 11/1998 | Ishii et al. ..................... 713/100 |
| 5,925,140 | A | * | 7/1999 | Hudson .......................... 714/52 |
| 6,052,781 | A | * | 4/2000 | Weber ............................ 726/22 |
| 6,282,700 | B1 | * | 8/2001 | Grover et al. ................. 717/170 |
| 6,631,520 | B1 | * | 10/2003 | Theron et al. ................. 717/173 |
| 6,763,458 | B1 | * | 7/2004 | Watanabe et al. ............. 713/100 |
| 6,795,912 | B1 | * | 9/2004 | Itoh et al. .......................... 713/2 |
| 6,996,819 | B1 | * | 2/2006 | Alanis .......................... 717/173 |
| 7,047,283 | B1 | * | 5/2006 | Kim .............................. 717/168 |
| 7,055,148 | B2 | * | 5/2006 | Marsh et al. .................. 717/172 |

(Continued)

FOREIGN PATENT DOCUMENTS

JP     2000-336861    * 11/2000

(Continued)

OTHER PUBLICATIONS

Chan, et al., "BootJacker: Comprimising Computers using Forced Restarts", Oct. 2008, ACM; [retrieved on Jul. 19, 2012]; Retrieved from Internet<URL:http://dl.acm.org/citation.cfm?id= 1455770>; pp. 555-564.*

(Continued)

*Primary Examiner* — Thuy Dao
*Assistant Examiner* — Xi D Chen
(74) *Attorney, Agent, or Firm* — Volentine & Whitt, PLLC

(57) ABSTRACT

A system, related hard disk drive (HDD) and method are disclosed in which a firmware download to the HDD is accomplished by receiving it from the host and storing it to a first region of a disk in the HDD. The value of a download flag is set once the firmware download is complete. After the system performs an OFF/ON power cycle, it checks the value of the download flag and changes a Logical Block Address mapping a second region of a non-user data region of the disk storing a DOS boot program. The firmware download is transferred from the first region to a third region of the disk or a non-volatile memory device following execution of a boot procedure by the host using the DOS boot program.

19 Claims, 4 Drawing Sheets

U.S. PATENT DOCUMENTS

| | | | | |
|---|---|---|---|---|
| 7,146,412 | B2 * | 12/2006 | Turnbull | 717/173 |
| 7,155,640 | B2 * | 12/2006 | Nam | 714/42 |
| 7,191,437 | B1 * | 3/2007 | Coatney et al. | 717/174 |
| 7,197,634 | B2 * | 3/2007 | Kruger et al. | 713/1 |
| 7,376,943 | B2 * | 5/2008 | Lu | 717/168 |
| 7,426,633 | B2 * | 9/2008 | Thompson et al. | 713/2 |
| 7,427,027 | B2 * | 9/2008 | Elhamias et al. | 235/451 |
| 7,441,113 | B2 * | 10/2008 | Chong et al. | 713/2 |
| 7,464,228 | B2 * | 12/2008 | Chan et al. | 711/153 |
| 7,480,907 | B1 * | 1/2009 | Marolia et al. | 717/174 |
| 7,516,450 | B2 * | 4/2009 | Ogura | 717/174 |
| 7,664,981 | B2 * | 2/2010 | Kim | 714/5.1 |
| 7,730,474 | B2 * | 6/2010 | Izuta et al. | 717/174 |
| 7,814,261 | B2 * | 10/2010 | Lee | 717/168 |
| 7,818,566 | B2 * | 10/2010 | Artobbello et al. | 713/164 |
| 8,046,776 | B1 * | 10/2011 | Huang et al. | 717/168 |
| 8,209,680 | B1 * | 6/2012 | Le et al. | 717/174 |
| 2003/0204711 | A1 * | 10/2003 | Guess | 717/168 |
| 2004/0015941 | A1 * | 1/2004 | Sekine | 717/168 |
| 2004/0083469 | A1 * | 4/2004 | Chen et al. | 717/174 |
| 2004/0226008 | A1 * | 11/2004 | Jacobi et al. | 717/174 |
| 2006/0095583 | A1 * | 5/2006 | Owhadi et al. | 709/238 |
| 2007/0113062 | A1 * | 5/2007 | Osburn et al. | 713/1 |
| 2007/0234332 | A1 * | 10/2007 | Brundridge et al. | 717/168 |
| 2007/0288986 | A1 * | 12/2007 | Candelore et al. | 725/132 |
| 2008/0040713 | A1 * | 2/2008 | Subbakrishna et al. | 717/173 |
| 2008/0052506 | A1 * | 2/2008 | Iima et al. | 713/1 |
| 2010/0058322 | A1 * | 3/2010 | Oikawa et al. | 717/173 |
| 2010/0153696 | A1 * | 6/2010 | Beachem et al. | 717/174 |
| 2011/0173604 | A1 * | 7/2011 | Nakamura et al. | 717/173 |

FOREIGN PATENT DOCUMENTS

| | | |
|---|---|---|
| JP | 2004287979 | 10/2004 |
| KR | 0121551 B | 11/1997 |
| KR | 1020000002384 A | 1/2000 |
| KR | 100441171 B1 | 7/2004 |

OTHER PUBLICATIONS

Jung, et al., "Physocally Addressed Queueing (PAQ): Improving Parallelism in Solid State Disks", 2012 IEEE; [retrieved on Jul. 19, 2012]; Retrieved from Internet<URL:http://ieeexplore.ieee.org/stamp/stamp.jsp?tp=&arnumber=6237035>;pp. 404-415.*

Kuehn, "Considerations in a Dual Boot Strategy", Oct. 2008, ACM; [retrieved on Jul. 19, 2012]; Retrieved from Internet<URL:http://dl.acm.org/citation.cfm?id=1449956>;pp. 263-270.*

Wu, et al., "A High Performance Serial ATA Host Controller", 2008, IEEE;[retrieved on Jul. 19, 2012]; Retrieved from Internet<URL:http://ieeexplore.ieee.org/stamp/stamp.jsp?tp=&arnumber=4722554>;pp. 18-23.*

* cited by examiner

FIG. 4

| offset | definition | |
|---|---|---|
| 0 | execution flag | |
| 1~6 | cylinder | ⎫ |
| 7~10 | head/sector | ⎬ 1st format |
| 11 | offset | ⎬ |
| 12~13 | WORD data | ⎭ |
| 14~26 | 2nd format | |
| 27~39 | 3rd format | |
| • | • | |
| • | • | |
| • | • | |
| 378~390 | 30th format | |
| 510~511 | checksum | |

HARD DISK DRIVE WITH DISK EMBEDDED DOS BOOT IMAGE AND FIRMWARE DOWNLOAD METHOD

BACKGROUND OF THE INVENTION

1. Field of the Invention

The present invention relates to a hard disk drive (HDD). More particularly, the invention relates to a HDD containing a built-in Disk Operating System (DOS) boot program and a related firmware download method.

This application claims priority under 35 U.S.C. §119 to Korean Patent Application No. 10-2006-0078695, filed on Aug. 21, 2006, the subject matter of which is hereby incorporated by reference.

2. Discussion of Related Art

In many applications, conventional HDDs download software components of constituent firmware (hereafter referred to as "downloading the firmware" from the cache memory of a host device (e.g., a Personal Computer) using a so-called PIO data transfer. In many contemporary implementations, this download of microcode is defined by an industry standard known as the Advanced Technology Attachment (ATA) specification.

After downloading the firmware, the HDD often deletes existing data stored in flash memory associated with the HDD's microprocessor, writes the downloaded firmware to flash memory as new data, and performs verification procedures. In this manner, firmware is downloaded to non-user regions, such as a maintenance region, of one or more disks within the HDD.

After downloading the firmware, the foregoing writing and verification procedures require a "re-start" procedure (e.g., the HDD and incorporating host device cycle power OFF and ON) to initialize system data by reading the data newly stored to the non-user region of the disk.

Unfortunately, the HDD enters a non-accessible state, wherein the HDD can not respond to commands received from the host device, during the OFF/ON power cycle. However, conventional operating systems (OS) typically found in host devices, such as Windows™, must be "normally" closed in order to properly perform an OFF/ON power cycle. In order to normally close a running OS, read/write operations or swap file dump operations from various system files must access the HDD. In such circumstances, downloading the firmware may be impossible.

Therefore, many conventional host devices store a system download utility in the HDD which boots in DOS mode. Such download utilities are capable of running in response to execution files contained in a peripheral data storage device, such as a floppy disk. However, many contemporary host devices no longer come with a floppy disk drive. As a result, host device users may fail to download new firmware to the hard disk drive. Alternately, where firmware downloads are possible, contemporary host devices may require some proficiency in DOS command operations by the end user. Absent such proficiency, a technician must be retained to perform firmware downloads. Any one of these alternatives is distasteful to most host device users.

SUMMARY OF THE INVENTION

Embodiments of the invention provide a HDD including a disk with a built-in DOS boot image that facilitates firmware downloads. Embodiments of the invention also provide a method of downloading firmware to a HDD having a disk with a built-in DOS boot image.

BRIEF DESCRIPTION OF THE DRAWINGS

FIG. 4 illustrates the structure of a data sector included in firmware for performing vendor-unique command using a firmware download operation for a HDD according to an embodiment of the invention.

DESCRIPTION OF EMBODIMENTS

Figure 1:
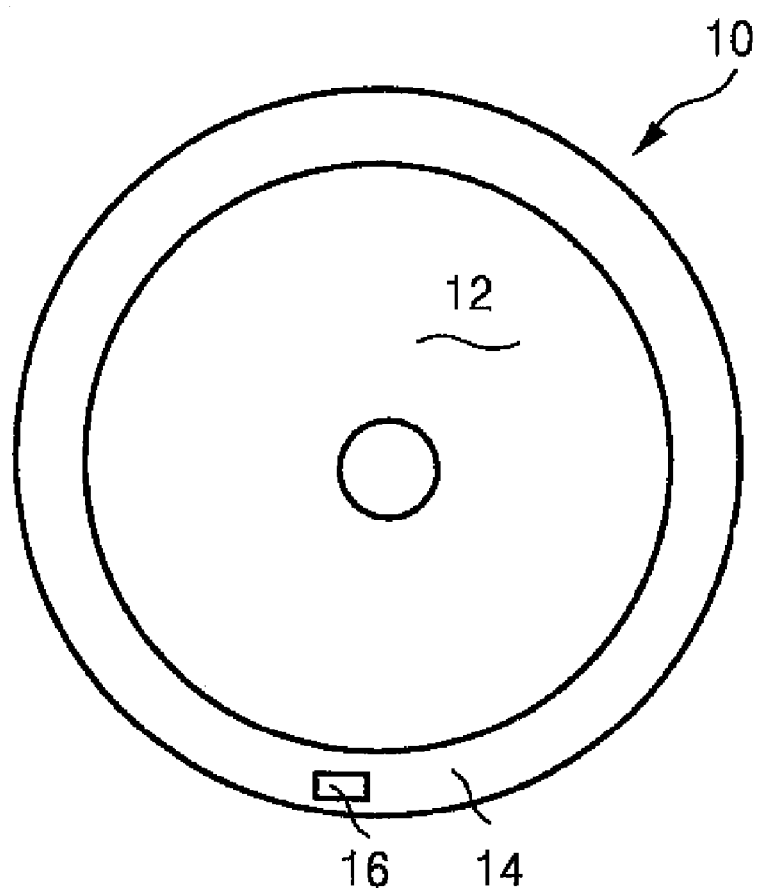
FIG. 1 is a schematic illustration of a disk according to an embodiment of the invention.

FIG. 1 is a schematic illustration of a disk according to an embodiment of the invention. Referring to FIG. 1, a disk 10 is capable of being incorporated within a HDD and used as data storage medium. As is conventionally understood, disk 10 includes a plurality of tracks arranged in concentric circles. Tracks in a user data storage region 12 store user-defined data. Other tracks located in a non-user data storage region 14 store other types of data, such as physical information data associated with the HDD and a DOS boot program (or DOS boot image). In the context of current HDD disk layouts, non-user data region 14 may be a maintenance cylinder.

Figure 2:
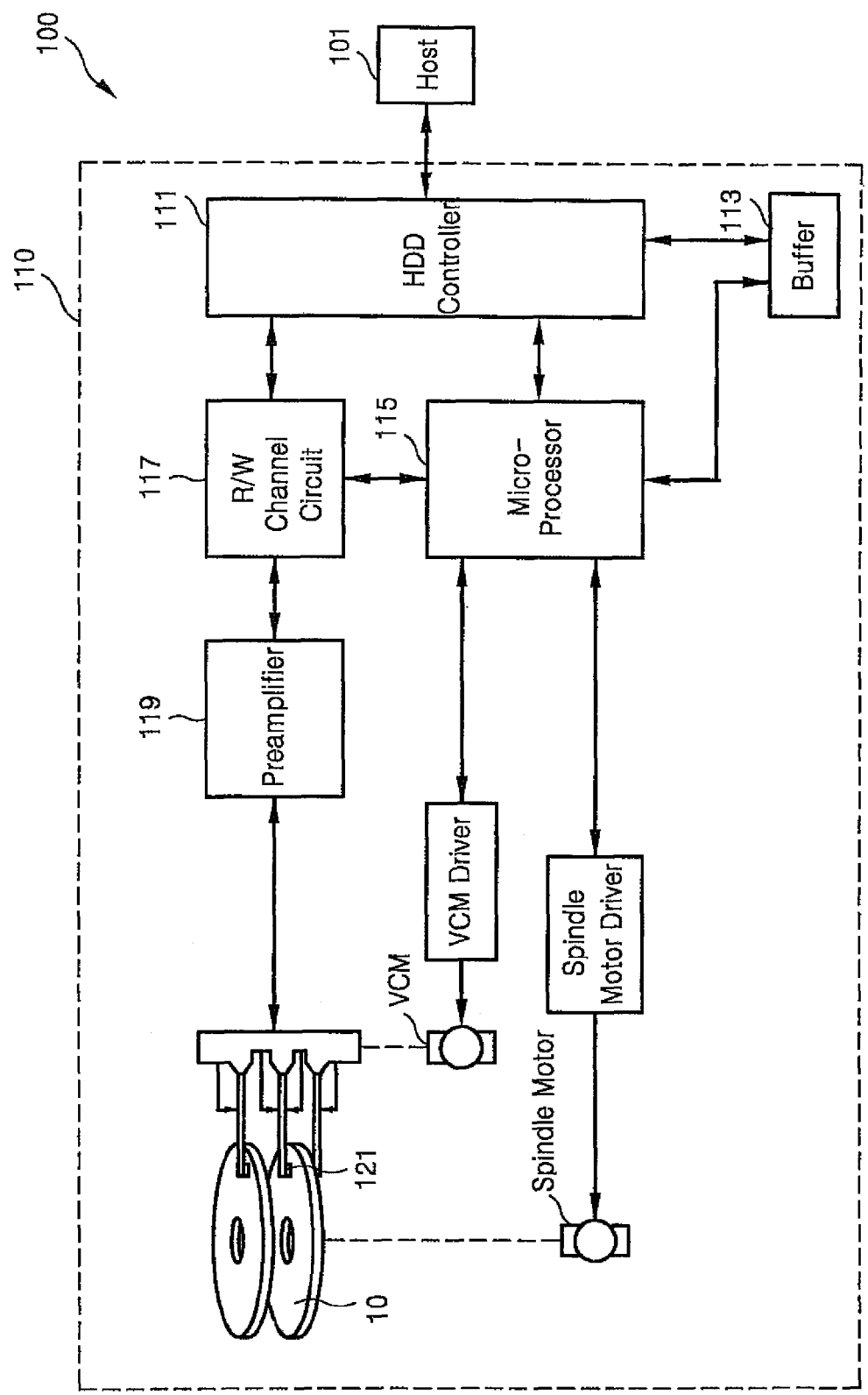
FIG. 2 is a functional block diagram of a computer system including a HDD comprising a disk with a built-in DOS boot program according to an embodiment of the invention.

FIG. 2 is a functional block diagram of a computer system including a HDD comprising a disk having a built-in DOS boot program according to an embodiment of the invention.

Referring to FIGS. 1 and 2, a user is assumed to have received a firmware download to HDD 110 from host device 101 connected to the Internet, for example. The HDD firmware download is first stored in a cache memory (not shown) associated with host 101. When the user or system initiates the firmware download (e.g., by executing a related firmware download tool), a corresponding command—such as a download microcode command within the vernacular of the ATA-specification—causes transfer of the firmware download to HDD 110.

The firmware download is received through a HDD controller 111 and initially stored in a buffer memory 113. The firmware download is then written from buffer 113 to a first region in user region 12 or non-user region 14 of disk 10. This data write operation(s) may be conventionally accomplished using HDD controller 111, a read/write (R/W) channel circuit 117, a preamplifier 119, and a magnetic head 121, all under the control of a microprocessor 115.

When the firmware download to the first region is complete, microprocessor 115 sets the value of a related download flag. Thereafter, the host operating system (OS) may initiate subsequent operations (e.g., read/write operations) in relation to the value of the download flag.

When the firmware download to disk 10 of HDD 110 is complete and a re-start operation is required, host 101 may generate a corresponding user message. In response to this message, the user may initiate an OFF/ON power cycle for system 100. A series of boot procedures runs during the OFF/ON power cycle.

Upon being powered back ON, system 100 causes microprocessor 115 to check the value of the download flag and reset the logical block address (LBA) associated with a second region 16 in non-user region 14 where the DOS boot program is stored in response to the value of the download flag. The boot program stored in second region 16 of non-user region 14 is capable of booting system 100 in DOS mode.

Additionally, when system 100 is powered back ON, the system BIOS stored in a BIOS ROM in host 101 runs. The BIOS may perform a Power-On Self Test procedure that determines the hardware operating state of system 100. Thereafter, as part of a conventionally understood set-up protocol, a boot program in the BIOS searches for the drive, such as HDD 110, containing an OS system boot file. In the context of many contemporary host devices, the BIOS searches for two files identified as IO.SYS and MSDOS.SYS.

In system 100 according to an embodiment of the invention, when the BIOS recognizes second region 16 storing the DOS boot program as a new device according to the updated LBA mapping, the BIOS then searches for specific files, thereby identifying, as examples, a master boot record and/or boot sector data. Once identified, these files are loaded into main memory (not shown) of host 101. When executed, the master boot record retrieves an initial system file, such as IO.SYS, from the DOS boot program stored in second region 16 and loads it into the main memory. Thereafter, an initial file named SYSINIT loads a system file MSDOS. SYS.

That is, the DOS boot program stored in second region 16 of non-user data region 14 is loaded to the main memory of host 101 and run as part of the re-booting procedure following the OFF/ON power cycle. Thereafter, microprocessor 115 transfers the download firmware stored in the first region to a third region of non user data region 14 or a non-volatile memory device (e.g., flash ROM or flash hybrid device) associated with microprocessor 115.

Once the firmware download initially stored in the first region is transferred (i.e., written) to the third region of non-user data region 14 or a non-volatile device associated with microprocessor 115, the downloading of the firmware is complete and properly set up on HDD 110.

Of additional note, the firmware download may include one or more data sector(s) containing vendor-unique commands. Microprocessor 115 may be configured to execute these vendor-unique commands in the normal control of HDD 110 and in response to system commands and/or user defined data.

For example, FIG. 4 illustrates the structure of a data sector in a firmware download containing data associated with a vendor-unique command.

Referring to FIGS. 2 and 4, microprocessor 115 will search for at least one data sector, such as the one illustrated in FIG. 4, associated with a vendor-unique command. In one embodiment of the invention, this information is contained in a predetermined location within the firmware download, such as a first sector. Such information may be used to execute the vendor-unique command in microprocessor 115.

For example, if the first sector of the firmware download is set up as a sector implementing a vendor-unique command, microprocessor 115 may perform the vendor-unique command using the first sector to thereafter recognize a second and subsequent sectors as the actual firmware download.

This approach allows many different vendor-unique commands to be recognized within embodiments of the invention, while not mandating multiple unique data structures and/or execution paths. Naturally, the structure of such data sector(s) will vary with application and vendor-unique command.

However, in embodiments of the invention, execution of such vendor-unique commands may change one or more parameters (e.g., such as those indicating a magnetic head flying height, environmental conditions, etc.) stored on the disk.

Referring to FIG. 4, a 0th bite of the data sector may be used to store the value of the download flag indicating whether or not a firmware download to HDD 110 has been conducted. The 1st through 10th bites of the data sector may be used to store physical information data (e.g., cylinder head sector information, CHS, etc.). These operational parameters of HDD 110 may be changed by the firmware download. The 11th bite of the data sector may be used as a virtual address to store the actual address of data defining a parameter. The 12th and 13th bites of the data sector may be used to write new parameter values.

Thus, the 1st through 13th bites may be used to set up or change a first parameter value. The 14th through 26th bites may similarly be used to set up or change another parameter value, etc. Multiple data sectors having the data structure shown in FIG. 4 may be used as required.

In one embodiment of the invention, the firmware download may include only one or more data sectors. In other words, a vendor-unique command may be implemented by a firmware download including only one or more data sectors.

Referring again to FIG. 1, while the firmware is downloaded, microprocessor 115 may generate a message to host 101 indicating that the firmware download is in progress. Also, when the firmware download is complete, microprocessor 115 generates a message indicating the need for the OFF/ON power cycle. Therefore, the OFF/ON power cycle required to initialize the operating state of the system including HDD 110 by reading the information stored in non-user data region 14 of disk 10 may be performed automatically or by user command.

Figure 3:
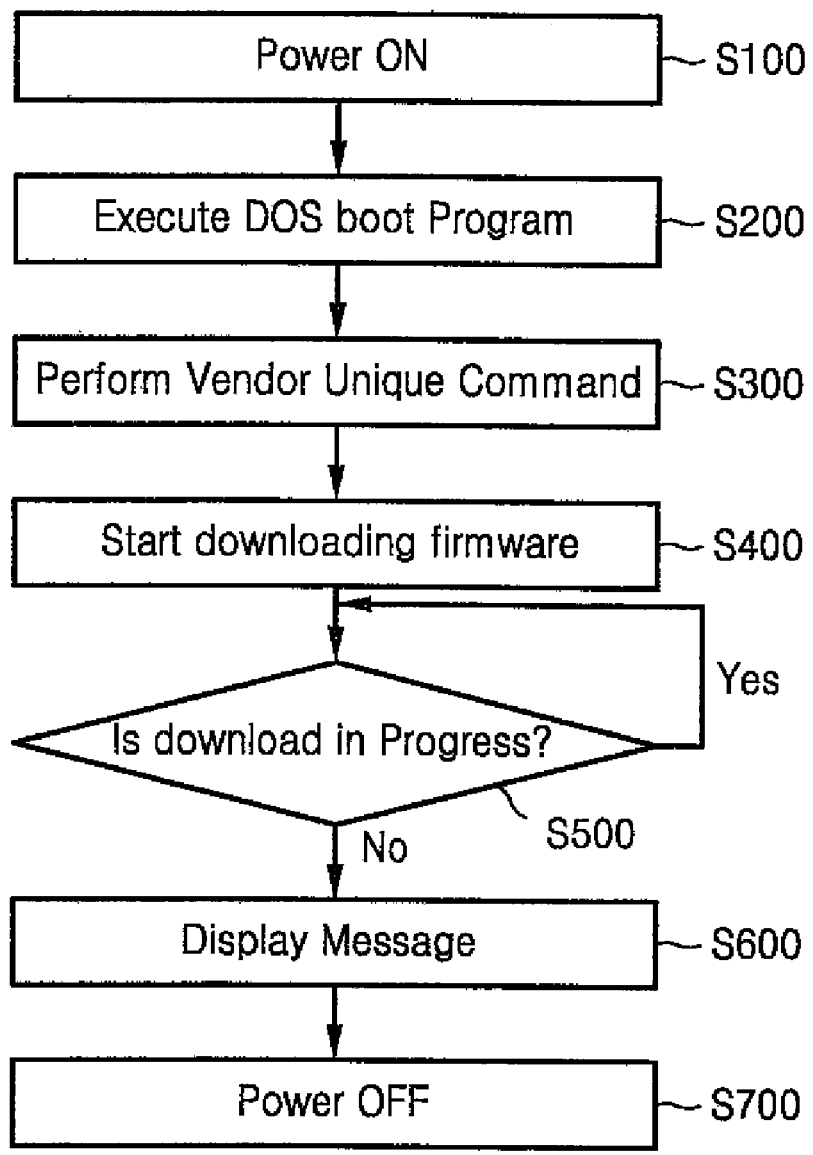
FIG. 3 is a flowchart summarizing the flow of a firmware download operation to a HDD according to an embodiment of the invention.

One method of downloading firmware to HDD 110 according to an embodiment of the invention will be explained with reference to FIGS. 2 and 3. FIG. 3 is a flowchart summarizing the flow of a firmware download storing data in a first region of non-user data region 14.

When system 100 is turned ON (S100), host 101 boots under the direction of a DOS boot program stored in second region 16 of non-user data region 14 (S200). When a data sector implementing a vendor-unique command is included in the firmware downloaded to the first region, microprocessor 115 may perform the vendor-unique command according to the data sector (S300).

Also, microprocessor 115 transfers the firmware download from the first region to a third region of non-user data region 14 or a non-volatile memory device, such as flash ROM, associated with microprocessor 115 (S400).

Also, microprocessor 115 determines whether or not a firmware download has occurred (S500) in relation to a value of a corresponding download flag, and may output a message indicating the need for an OFF/ON power cycle to host 101 once the download is complete (S600). Accordingly, a firmware download to HDD 110 may be completed when a user indicates an OFF/ON power cycle for system 100 (S700). This OFF/ON power cycle allows completion of the set up and installation of the newly downloaded firmware to HDD 110.

Computer readable recording medium may be used to implement one or more software components implementing a method according to an embodiment of the invention. Computer readable recording medium includes all kinds of recording devices, where data readable by system 100 may be stored. Such medium includes non-volatile memory devices such as ROM or flash memory device, a microprocessor, a CPU, a disk, etc. Also, a computer readable recording medium is distributed in the computer system, and it may be stored and performed in a computer readable code in a distribution method. And a functional program, codes, and code segments for describing the present invention may be understood easily by programmers in an art.

As described above, a HDD including a disk having a DOS boot program stored in a non-user region according to an embodiment of the present invention may download firmware even when there is not an external storage medium such as floppy disk drive or optical disk drive. Also, it may readily implement a vendor-unique command besides downloading the firmware.

The foregoing embodiments are presented as teaching examples and have been drawn to examples making certain assumptions drawn contemporary systems, operating systems, and hardware options. The invention is not limited to only the illustrated embodiments, but more broadly encompasses the subject matter set forth in the following claims.

What is claimed is:

1. A hard disk drive (HDD) operable within a host, and comprising:
 a disk having a user data region adapted to store user defined data and a non-user data region storing physical information data associated with the HDD and a Disk Operating System (DOS) boot program; and
 a microprocessor configured to execute an algorithm, comprising:
  receiving a firmware download from the host,
  storing the firmware download to a first region of the disk,
  in response to completing the step of storing the firmware download to the first region of the disk:
   setting a download flag value, and
   generating a message to the host indicating a need for an OFF/ON power cycle, and
  following the OFF/ON power cycle:
   resetting Logical Block Address (LBA) mapping for a second region of the non-user data region storing the DOS boot program in response to the value of the download flag having been set, and
   controlling transfer of the firmware download from the first region to a third region of the non-user data region following execution of a boot procedure run by the host using the DOS boot program.

2. The HDD of claim 1, wherein the firmware download comprises a data sector including data associated with a vendor-unique command.

3. The HDD of claim 2, wherein the microprocessor is further adapted to execute the vendor-unique command and set up at least one parameter value stored in the non-user region.

4. The HDD of claim 2, wherein the microprocessor is further adapted to execute the vendor-unique command included in the firmware stored on the disk to change a magnetic head flying height for the disk.

5. The HDD of claim 1, wherein the microprocessor is further configured to output a message to the host indicating an ongoing firmware download.

6. The HDD of claim 1, further comprising a buffer memory, and wherein receiving the firmware download from the host and storing the firmware download to the first region of the disk comprises:
 receiving the firmware download in the buffer memory; and
 writing the firmware download from the buffer memory to the first region of the disk.

7. A system comprising:
 a host; and
 a hard disk drive (HDD) operable in conjunction with the host, the HDD comprising:
  a disk having a user data region adapted to store user defined data and a non-user data region storing physical information data associated with the HDD and a DOS boot program; and
  a microprocessor configured to execute an algorithm, comprising:
   receiving a firmware download from the host,
   storing the firmware download to a first region of the disk,
   in response to completing the step of storing the firmware download to the first region of the disk:
    setting a download flag value, and
    generating a message to the host indicating a need for an OFF/ON power cycle, and
   following the OFF/ON power cycle:
    resetting Logical Block Address (LBA) mapping for a second region of the non-user data region storing the DOS boot program in response to the value of the download flag having been set, and
    controlling transfer of the firmware download from the first region to a third region of the non-user data region following execution of a boot procedure run by the host using the DOS boot program.

8. The system of claim 7, wherein the HDD further comprises a buffer memory, and wherein receiving the firmware download from the host and storing the firmware download to the first region of the disk comprises:
 receiving the firmware download in the buffer memory; and
 writing the firmware download from the buffer memory to the first region of the disk.

9. The system of claim 7, wherein the firmware download comprises a data sector including data associated with a vendor-unique command, and wherein the microprocessor is further adapted to execute the vendor-unique command included in the firmware stored on the disk to change a magnetic head flying height for the disk.

10. In a system including a hard disk drive (HDD) and a host, a method of downloading firmware to the HDD, comprising:
 receiving a firmware download in the HDD from the host and storing the firmware download to a first region of a disk in the HDD;
 once the firmware download is complete:
  setting the value of a download flag, and
  generating a message from the HDD to the host indicating the need for the OFF/ON power cycle;
 performing a system OFF/ON power cycle; and
 following the system OFF/ON power cycle:
  checking the value of the download flag and, in response to the value of the download flag having been set, changing a Logical Block Address mapping a second region of a non-user data region of the disk storing a DOS boot program and
  transferring the firmware download from the first region to a third region of the disk following execution of a boot procedure by the host using the DOS boot program.

11. The method of claim 10, further comprising during the firmware download:
generating a message from the HDD to the host indicating that the firmware download is in progress.

12. The method of claim 10, wherein the firmware download comprises a data sector including data associated with a vendor-unique command.

13. The method of claim 12, wherein execution of the vendor-unique command sets up at least a parameter value stored in the non-user region.

14. The method of claim 12, wherein the microprocessor is further adapted to execute the vendor-unique command included in the firmware stored on the disk to change a magnetic head flying height for the disk.

15. The method of claim 10, further comprising a buffer memory, and wherein receiving the firmware download from the host and storing the firmware download to the first region of the disk comprises:
receiving the firmware download in the buffer memory; and
writing the firmware download from the buffer memory to the first region of the disk.

16. A computer readable recording medium having embodied thereon a computer program to execute a method of downloading firmware to a hard disk drive (HDD), the method comprising:
receiving a firmware download in the HDD from the host in response to a download command and storing the firmware download to a first region of a disk in the HDD;
once the firmware download is complete:
setting the value of a download flag, and
generating a message from the HDD to the host indicating the need for the OFF/ON power cycle;
performing a system OFF/ON power cycle; and
following the system OFF/ON power cycle:
checking the value of the download flag and, in response to the value of the download flag having been set, changing a Logical Block Address mapping a second region of a non-user data region of the disk storing a DOS boot program and
transferring the firmware download from the first region to a third region of the disk following execution of a boot procedure by the host using the DOS boot program.

17. The computer readable recording medium of claim 16, wherein the method further comprises, during the firmware download:
generating a message from the HDD to the host indicating that the firmware download is in progress.

18. The computer readable recording medium of claim 16, wherein the firmware download comprises a data sector including data associated with a vendor-unique command.

19. The computer readable recording medium of claim 16, wherein execution of the vendor-unique command sets up at least a parameter value stored in the non-user region.

* * * * *